United States Patent
Linkewitsch

(10) Patent No.: US 9,268,686 B2
(45) Date of Patent: Feb. 23, 2016

(54) BACKGROUND REORDERING—A PREVENTIVE WEAR-OUT CONTROL MECHANISM WITH LIMITED OVERHEAD

(75) Inventor: Niklas Linkewitsch, Evessen (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/991,338

(22) PCT Filed: Dec. 5, 2011

(86) PCT No.: PCT/US2011/063342
§ 371 (c)(1),
(2), (4) Date: Aug. 5, 2014

(87) PCT Pub. No.: WO2013/085488
PCT Pub. Date: Jun. 13, 2013

(65) Prior Publication Data
US 2014/0379960 A1      Dec. 25, 2014

(51) Int. Cl.
| | | |
|---|---|---|
| G06F 13/12 | (2006.01) | |
| G06F 13/38 | (2006.01) | |
| G06F 12/02 | (2006.01) | |
| G06F 3/06 | (2006.01) | |

(52) U.S. Cl.
CPC ............ *G06F 12/0246* (2013.01); *G06F 3/065* (2013.01); *G06F 3/0619* (2013.01); *G06F 3/0638* (2013.01); *G06F 3/0679* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 6,000,006 A * | 12/1999 | Bruce et al. | 711/103 |
| 6,230,233 B1 | 5/2001 | Lofgren et al. | |
| 2007/0061502 A1 * | 3/2007 | Lasser et al. | 711/103 |
| 2007/0083698 A1 | 4/2007 | Gonzalez et al. | |
| 2007/0186033 A1 | 8/2007 | Shinagawa et al. | |
| 2010/0027335 A1 * | 2/2010 | Kim et al. | 365/185.09 |

(Continued)

FOREIGN PATENT DOCUMENTS

CN    101354681 A    1/2009

OTHER PUBLICATIONS

International Preliminary Report on Patentability mailed Jun. 19, 2014 for International Application No. PCT/US2011/063342, 5 pages.

(Continued)

*Primary Examiner* — Elias Mamo
(74) *Attorney, Agent, or Firm* — Schwabe, Williamson & Wyatt, P.C.

(57) ABSTRACT

Embodiments of the present disclosure describe background reordering techniques and configurations to prevent wear-out of an integrated circuit device such as a memory device. In one embodiment, a method includes receiving information about one or more incoming access transactions to a memory device from a processor, determining that a wear-leveling operation is to be performed based on a cumulative number of access transactions to the memory device, the cumulative number of access transactions including the one or more incoming access transactions, and performing the wear-leveling operation by mapping a first physical address of the memory device to a second physical address of the memory device based on a pseudo-random mapping function, and copying information from the first physical address to the second physical address. Other embodiments may be described and/or claimed.

24 Claims, 6 Drawing Sheets

(56) References Cited

U.S. PATENT DOCUMENTS

| | | | |
|---|---|---|---|
| 2010/0064094 A1* | 3/2010 | Yeh | 711/103 |
| 2010/0115912 A1* | 5/2010 | Worley | 60/39.15 |
| 2010/0191897 A1 | 7/2010 | Zhang et al. | |
| 2010/0325340 A1 | 12/2010 | Feldman et al. | |
| 2011/0027335 A1* | 2/2011 | Fortune et al. | 424/423 |
| 2011/0264847 A1* | 10/2011 | Hsiao | 711/103 |

OTHER PUBLICATIONS

International Search Report and Written Opinion for PCT/US2011/063342, mailed Jul. 31, 2012, 6 pages.

* cited by examiner

BACKGROUND REORDERING—A PREVENTIVE WEAR-OUT CONTROL MECHANISM WITH LIMITED OVERHEAD

CROSS REFERENCE TO RELATED APPLICATION

The present application is a national phase entry under 35 U.S.C. §371 of International Application No. PCT/US2011/063342, filed Dec. 5, 2011, entitled "BACKGROUND REORDERING—A PREVENTIVE WEAR-OUT CONTROL MECHANISM WITH LIMITED OVERHEAD," which designates the United States of America and the entire contents and disclosures of which are hereby incorporated by reference in their entireties.

FIELD

Embodiments of the present disclosure generally relate to the field of integrated circuits, and more particularly, to background reordering techniques and configurations to prevent wear-out of an integrated circuit device such as a memory device.

BACKGROUND

Storage devices such as, for example, non-volatile memory devices, may have notably reduced lifetimes due to individual storage elements being worn-out earlier than other storage elements. Current wear leveling methods have been developed to mitigate the wearing of the individual storage elements. For example, current wear leveling methods may include "out-of-place" storage of sectors of information in conjunction with garbage collection processes. However, such methods may require storage of large amounts of meta-information to track what information is stored at storage locations of the storage device. The meta-information may be stored in the storage device itself. The overhead for reorganizing the information using such methods may grow significantly with the utilization of the storage device and may not have a fixed relation to an access rate to the storage device. Further, in current methods, the order in which the data is organized may not be pre-determined and the reordering may be based on a wear-level of individual storage elements of the storage device. These current methods may not support fine granular access to the storage device such as occurs when the storage device is used as a part of main memory for a processor.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
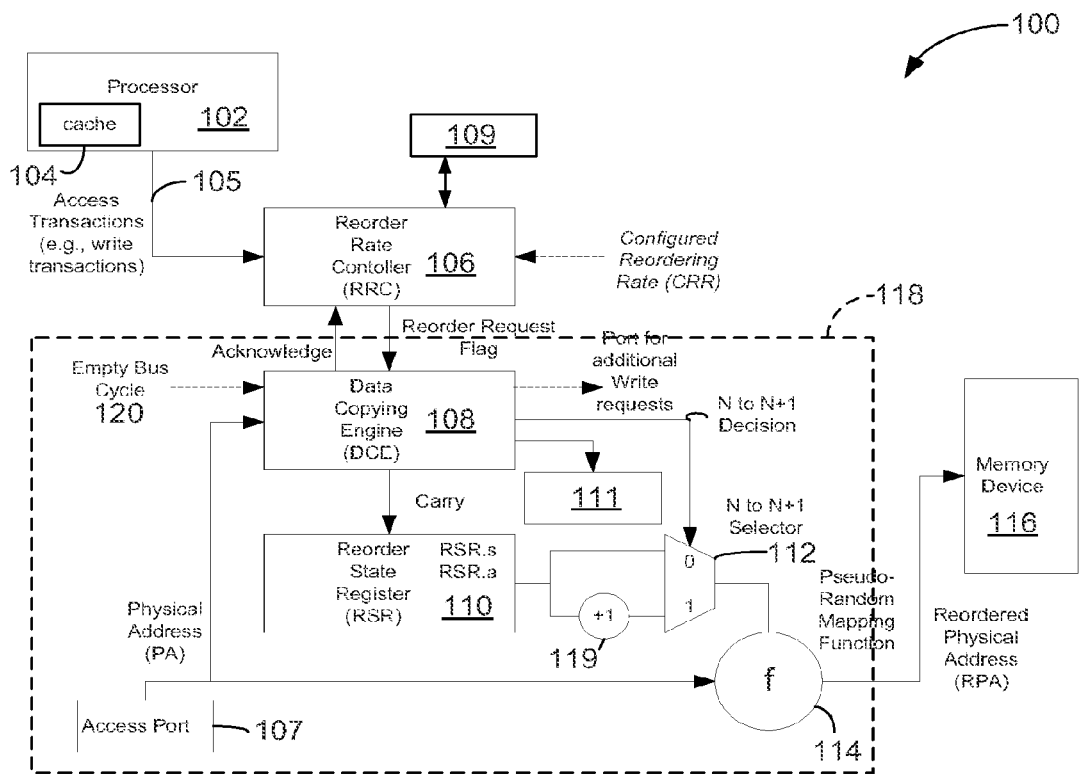
FIG. 1 schematically illustrates a background reordering system in accordance with some embodiments.

Embodiments of the present disclosure describe background reordering techniques and configurations to prevent wear-out of an integrated circuit device such as a memory device. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. The term "coupled" may refer to a direct connection, an indirect connection, or an indirect communication.

According to various embodiments, the present disclosure describes a method comprising receiving information about one or more incoming access transactions to a memory device from a processor, determining that a wear-leveling operation is to be performed based on a cumulative number of access transactions to the memory device, the cumulative number of access transactions including the one or more incoming access transactions, and performing the wear-leveling operation by mapping a first physical address of the memory device to a second physical address of the memory device based on a pseudo-random mapping function; and copying information from the first physical address to the second physical address.

In some embodiments, determining that a wear-leveling operation is to be performed comprises comparing a ratio to a pre-determined value, the ratio including a cumulative number of wear-leveling operations performed for the memory device relative to a cumulative number of write transactions received for the memory device.

In some embodiments, the wear-leveling operation is performed if the ratio deviates from the pre-determined value.

In some embodiments, the information received about the one or more incoming access transactions includes one or more third physical addresses from the processor that correspond with the one or more incoming access transactions, the method further comprising mapping the one or more third physical addresses to one or more fourth physical addresses.

In some embodiments, the method includes determining whether information stored at the one or more third physical addresses has been reordered within a turnaround, the turnaround being a cyclical period defined by a time in which information stored at each physical address of the memory device has been reordered once, wherein each physical address has a corresponding temporary attribute that indicates whether the information stored at each physical address has been reordered or not for the turnaround.

In some embodiments, the method includes performing the one or more access transactions at the one or more fourth physical addresses, wherein ones of the one or more fourth physical addresses have a first value if it is determined that the information stored at corresponding ones of the one or more third physical addresses has been reordered within a turnaround, wherein ones of the one or more fourth physical addresses have a second value if it is determined that the information stored at corresponding ones of the one or more third physical addresses has not been reordered within a turnaround, the first value representing a different physical address than the second value, the one or more fourth physical addresses being different than the one or more third physical addresses.

In some embodiments, the method includes monitoring activity of a bus, wherein performing the wear-leveling operation is triggered by detection of an empty bus cycle.

In some embodiments, the wear-leveling operation is performed in a first dimension of at least two dimensions of the memory device, the first dimension defining a first level of memory organization and a second dimension defining a second level of memory organization, a first component of the first physical address provides an index to the second dimension, and a second component of the first physical address is dynamically mapped to an index in the first dimension. In some embodiments, the index to the first dimension indicates a bit within a line and the index to the second dimension indicates the line.

In some embodiments, the one or more incoming access transactions to the memory device include one or more evicted cachelines that are received from a cache of the processor, wherein a wear-out aware policy of the cache selects, in the second dimension, a third physical address of the memory device for storing the one or more evicted cachelines, the wear-out aware policy being aware of the wear-out of the memory device.

According to various embodiments, the present disclosure describes an apparatus, comprising an access port to receive information about one or more incoming access transactions to a memory device from a processor, a reorder rate control module to determine that a wear-leveling operation is to be performed based on a cumulative number of access transactions received for the memory device, the cumulative number of access transactions including the one or more incoming access transactions, and a data reordering module to perform the wear-leveling operation by copying information from a current physical address of the memory device to a reordered physical address of the memory device based on said determining that the wear-leveling is to be performed and on a pseudo-random function.

In some embodiments, the reorder rate control module determines that a wear-leveling operation is to be performed by comparing a ratio to a pre-determined value, the ratio including a cumulative number of wear-leveling operations performed for the memory device relative to a cumulative number of write transactions received for the memory device, wherein the wear-leveling operation is performed if the ratio deviates from the pre-determined value.

In some embodiments, the information received by the access port includes one or more intended physical addresses that correspond with the one or more incoming access transactions and the data reordering module includes a mapping function that is configured to calculate a reordered physical address for each of the one or more intended physical addresses.

In some embodiments, the reorder rate control module is configured to set a request flag based on a determination that the wear-leveling operation is to be performed, wherein the data reordering module includes a data copying engine that initiates copying of information from the current physical address of the memory device to the reordered physical address of the memory device based on the request flag, and wherein the mapping function that is configured to calculate the reordered physical address of the wear-leveling operation using the current physical address.

In some embodiments, the data copying engine is configured to determine whether information stored at the one or more intended physical addresses has been reordered within a turnaround, the turnaround being a cyclical period defined by a time in which information stored at each physical address of the memory device has been reordered once, wherein a temporary attribute corresponds to each physical address of the memory device having information stored therein, the temporary attribute indicating whether the information stored at each physical address has been reordered or not for the turnaround.

In some embodiments, the data reordering module further includes a reorder state register that includes at least one value that is incremented for each turnaround, wherein the mapping function is configured to calculate the reordered physical address of the wear-leveling operation and the reordered physical address for each of the one or more intended physical addresses based on the at least one value.

In some embodiments, the data reordering module is configured to monitor activity of the access port and is triggered to perform the wear-leveling operation when an empty bus cycle of the access port is detected.

In some embodiments, the memory device is configured to perform the one or more access transactions at the reordered physical addresses for each of the one or more intended physical addresses, wherein the one or more access transactions are performed in parallel with the data reordering module performing the wear-leveling operation.

In some embodiments, the data reordering module is configured to perform the wear-leveling operation in a first dimension of at least two dimensions of the memory device, the first dimension defining a first level of memory organization and a second dimension defining a second level of memory organization, the second dimension being different than the first dimension, wherein a component of the current physical address provides an index to the second dimension, and wherein another component of the current physical address is dynamically mapped to an index in the first dimension.

In some embodiments, the index to the first dimension indicates a bit within a line and the index to the second dimension indicates the line.

In some embodiments, the one or more incoming access transactions to the memory device include one or more evicted cachelines that are received from a cache of the processor, wherein a wear-out aware policy of the cache is configured to select, in the second dimension, a physical address of the memory device for storing the one or more evicted cachelines, the wear-out aware policy being aware of the wear-out of the memory device.

According to various embodiments, the present disclosure describes a system, comprising a processor, an access port to receive information about one or more incoming access transactions to a memory device from the processor, a reorder rate control module to determine that a wear-leveling operation is to be performed based on a cumulative number of access transactions received for the memory device, the cumulative number of access transactions including the received one or more incoming access transactions, and a data reordering module to perform the wear-leveling operation by copying information from a first physical address of the memory device to a second physical address of the memory device based on said determining that the wear-leveling is to be performed, wherein the wear-leveling operation follows a pre-determined and pseudo-random order.

In some embodiments, the reorder rate control module determines that a wear-leveling operation is to be performed by comparing a ratio to a pre-determined value, the ratio including a cumulative number of wear-leveling operations performed for the memory device relative to a cumulative number of write transactions received for the memory device, wherein the wear-leveling operation is performed if the ratio deviates from the pre-determined value.

In some embodiments, the information about the one or more incoming access transactions received by the access port includes one or more intended physical addresses that correspond with the one or more incoming access transactions and the data reordering module is configured to calculate a reordered physical address for each of the one or more intended physical addresses.

In some embodiments, the data reordering module is configured to determine whether information stored at the one or more intended physical addresses has been reordered within a turnaround, the turnaround being a cyclical period defined by a time in which information stored at each physical address of the memory device has been reordered once, wherein each physical address has a corresponding temporary attribute that indicates whether the information stored at each physical address has been reordered or not for the turnaround.

In some embodiments, the memory device is configured to perform the one or more access transactions at the reordered physical address corresponding to the one or more access transactions, wherein the one or more access transactions are performed in parallel with the data reordering module performing the wear-leveling operation.

In some embodiments, the data reordering module is configured to perform the wear-leveling operation by calculating the second physical address of the wear-leveling operation using the first physical address.

In some embodiments, the data reordering module is configured to monitor activity of the access port and is triggered to perform the wear-leveling operation when an empty bus cycle of the access port is detected.

In some embodiments, the data reordering module is configured to perform the wear-leveling operation in a first dimension of at least two dimensions of the memory device, the first dimension defining a first level of memory organization and a second dimension defining a second level of memory organization, the first dimension including bit-level access and the second dimension including line-level access, wherein a first component of the first physical address provides an index to the second dimension, and wherein a second component of the first physical address is dynamically mapped to an index in the first dimension.

In some embodiments, the system further includes a cache of the processor, wherein the one or more incoming access transactions to the memory device include one or more evicted cachelines that are received from the cache, wherein a wear-out aware policy of the cache is configured to evict cachelines that are mapped to least worn out physical addresses of the memory device based on statistics of potential bit-error events, the statistics including maximum observed number of bit-errors per block and/or accumulated number of bit errors per block.

FIG. 1 schematically illustrates a background reordering system 100 in accordance with some embodiments. The background reordering system 100 may include a processor 102 that is operatively coupled to a memory device 116. The processor 102 may include, for example, a central processing unit (CPU) in some embodiments. The processor 102 may include or be associated with a cache 104 that stores data for the processor 102 and the memory device 116 may include or be part of main memory for a processor-based system (e.g., processor-based system 800 of FIG. 8) that includes the processor 102 and/or the memory device 116. In some embodiments, the background reordering system 100 may support wear-leveling operation for fine granular access (e.g., a 64 byte cacheline).

According to various embodiments, the memory device 116 may be a non-volatile memory device such as, for example, a phase change memory (PCM) device or phase change memory and switch (PCMS) device, flash memory (e.g., NOR or NAND), and the like. Subject matter is not limited in this regard, and the memory device 116 may include other types of memory devices that benefit from the principles described herein.

The processor 102 may be configured to process, generate, or otherwise output one or more access transactions 105 intended for the memory device 116. For example, the one or more access transactions 105 may include one or more read events and/or write events.

The background reordering system 100 may be configured to reorder information stored in the memory device 116 as part of a wear-leveling operation based on a number of access transactions 105 to the memory device 116. The wear-leveling operation may include, for example, a mapping operation that maps a Physical Address (PA) to a Reordered Physical Address (RPA) and a copying transaction that moves data from the physical address to the reordered physical address of the memory device 116 to prevent excessive wear of individual storage elements (e.g., memory cells) of the memory device 116. The physical address may correspond to a specific location in the memory device 116 and may include, for example, a cell or a group of cells. In some embodiments, the physical address corresponds to a line having a size of 64 bytes. The physical address may correspond with other sizes of memory granularity in other embodiments. The background reordering system 100 may be configured to reorder the information in a pre-defined and reproducible pseudo-random order.

The background reordering system 100 may include a Reorder Rate Controller (RRC) 106 that is configured to control a rate of wear-leveling reordering in the memory device 116. The RRC 106 may be configured to monitor or track a number of access transactions 105 to the memory device 116 and set a reorder request flag based on the number of access transactions 105. In some embodiments, the RRC 106 may be configured to determine that a wear-leveling operation is to be performed based on a cumulative number of access transactions 105 to the memory device 116 received from the processor 102. For example, the RRC 106 may be set with a Configured Reordering Rate (CRR) that specifies a target ratio of accumulated wear-leveling operations relative to a number of accumulated normal write transactions (e.g., write operations that are not part of a wear-leveling operation) received for the memory device 116. In some embodiments, the RRC 106 may track a number of normal write transactions and a number of wear-leveling write transactions to the memory device 116 and set the reorder request flag to trigger a wear-leveling operation when a ratio of the number of wear-leveling transactions relative to the number of normal write transactions deviates from the CRR. In some embodiments, the CRR has a value between 2% to 6% representing a fixed energy overhead for performing wear-leveling operations in the memory device 116. In other embodiments, the CRR has a value of 4% (e.g., a single wear-leveling operation is performed, on average, for every twenty-five normal write transactions over the life of the memory device 116).

In some embodiments, an incoming write transaction increments a register 109 of the RRC 106 by a weight p (e.g., +1) and a wear-leveling transaction decrements the register 109 of the RRC 106 by a weight n (e.g., −25). In such a case, the RRC 106 may be configured to request wear-leveling transactions to target a value of 0 for the register 109 of the RRC 106. In some embodiments, the RRC is triggered to set a reorder request flag when the register 109 has a value of 0 or greater.

The RRC 106 may trigger the reordering based on total stress to the memory device 116 in contrast to other techniques that may trigger reordering based on stress to individual cells of the memory device 116. That is, the RRC 106 may ignore wear level of individual lines or cells. The background reordering system 100 may have overhead (e.g., energy, bandwidth, performance metrics, etc.) that has a fixed relation to the access rate to the memory device 116 and is pre-determined and constant over the life of the memory device 116.

Although an unbalanced wear-out may be allowed at the beginning of the life of the memory device 116 (e.g., write-stress not balanced when average write count to a cell is in the range of 1E4 and 1E5), the wear-out may become more balanced and level for the memory device 116 over time (e.g., write-stress may be balanced when average write count goes above 1E5 towards 1E6). The overhead may be kept independent from the utilization of the capacity of the memory device 116. Further, complex operations such as garbage collection may not be needed in the background reordering system 100.

Figure 2:
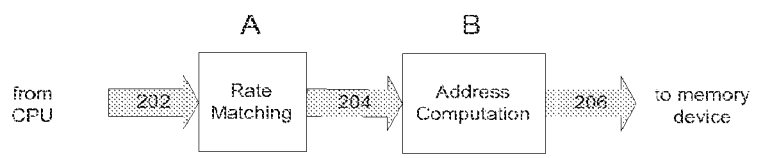
FIG. 2 illustrates a flow chart of background reordering in accordance with some embodiments.

Referring to FIG. 2, a flow chart 200 is depicted for background reordering in accordance with some embodiments. Referring to both FIGS. 1 and 2, at 202, one or more access transactions 105 and corresponding intended physical addresses for the one or more access transactions 105 are received from the processor 102. At Rate Matching block A, functionality (e.g., RRC 106) is provided to generate reordering transactions (e.g., a wear-leveling operation) based on the one or more access transactions 105. At 204, the intended physical addresses corresponding to the one or more access transactions 105 and a reordering transaction request, if generated, are sent to Address Computation block B. At Address Computation block B, functionality (e.g., data reordering module 118) is provided to calculate a reordered physical address for each of the intended physical addresses corresponding to the one or more access transactions 105 and a reordered physical address for the reordering transaction. At 206, the reordered physical addresses for the one or more transactions 105 and the reordering transaction are sent to the memory device 116 for the one or more access transactions 105 and the reordering transaction. In some embodiments, multiple reordering transactions may be generated for the one or more access transactions 105.

Returning to FIG. 1, According to various embodiments, the background reordering system 100 is configured to receive information about one or more incoming access transactions 105. For example, the RRC 106 may track a number of access transactions 105 and determine that a wear-leveling operation is to be performed based on a cumulative number of access transactions 105 to the memory device 116. The cumulative number of access transactions 105 may include the one or more incoming access transactions 105 in some embodiments.

In some embodiments, the information received about the one or more incoming access transactions 105 includes an intended physical address corresponding to each of the incoming access transactions 105. The data reordering module 118 may receive the one or more intended physical addresses via access port 107. The data reordering module 118 may include a Data Copying Engine (DCE) 108 that is configured to receive the one or more intended physical addresses and track, determine, or otherwise provide information about whether information stored at the one or more intended physical addresses has been reordered within a turnaround. The turnaround may be a cyclical period defined by a time in which information stored at each physical address of the memory device 116 has been reordered once. Data reordering (e.g., a wear-leveling operation) and normal access transactions may be performed in parallel in some embodiments. The DCE 108 may provide information of the copying progress to maintain consistency for the transactions.

In some embodiments, each physical address has a corresponding temporary attribute that facilitates tracking of copying progress for reordering transactions. For example, the temporary attribute can be used to determine whether the information stored at each physical address has been reordered to a new location or not for the turnaround. In one embodiment, all cells of a memory device 116 may have a temporary attribute of 0 at the beginning of the turnaround and all cells of the memory device 116 may have a temporary attribute of 1 at the end of the turnaround. Before a new turnaround starts, an "atomic" (e.g., non-interruptible) hardware operation may be performed that sets the temporary attributes of all cells back to a value that indicates that the cells have not been reordered.

At the end of each turnaround, the DCE 108 may instruct a Reorder State Register (RSR) 110 to increment (e.g., via a carry line) one or more values. The RSR 110 may represent a temporal state of reordering for the memory device 116. For example, the RSR 110 may store seed values that are used to generate pseudo-random values for the mapping function 114. In some embodiments, the RSR 110 includes at least a first component RSR.s, which may be used in a shifting function of the Pseudo-Random Mapping Function f (e.g., hereinafter "mapping function 114") and a second component RSR.a, which may be used in an adding function of the mapping function 114. In some embodiments, the DCE 108 instructs the RSR 110 to increment both the RSR.s component and the RSR.a component at the end of each turnaround. The RSR.s and RSR.a may each have a first value, collectively represented by N, that is sent to the mapping function 114 if the DCE 108 determines that information stored at the intended physical address of an access transaction has not been reordered within the turnaround and a second value, collectively represented by N+1 (e.g., the incremented RSR.s and RSR.a values), if the DCE 108 determines that information stored at the intended physical address of an access transaction has been reordered within the turnaround, the second value being different than the first value. First values, N, and second values, N+1, for the RSR.s and RSR.a may be constant for a given turnaround.

In some embodiments, the temporary attribute provided by the DCE 108 may include, for example, an array, A[ ], of 1-bit attributes to distinguish the N and N+1 cases for each cell or physical address of the memory device 116. For example, a value of 0 may indicate that the mapping function 114 uses N ("N mapping") to calculate a reordered physical address and a value of 1 may indicate that the mapping function 114 uses N+1 ("N+1 mapping") to calculate a reordered physical address. The array A[ ] may have one entry for each cell or address. In other embodiments, the temporary attribute may be calculated, e.g., when powering the background reordering system 100 up or waking from standby, which may allow powering down of the background reordering system 100 without saving a full array A[ ] of attributes for each cell. In some embodiments, the temporary attribute may be calculated for every incoming access transaction. In still other embodiments, combinations of these techniques may be used. For example, some temporary attributes may be stored in an array for a critical region of the memory device 116 and remaining temporary attributes may be calculated for each incoming access transaction to a physical address that is external to the critical region.

The DCE 108 may send (e.g., via the N to N+1 Decision line of FIG. 1) information (e.g., 1 or 0) that indicates whether an intended physical address has been reordered or not for the turnaround to a multiplexer such as to N to N+1 Selector 112 (hereinafter "selector 112"). In some embodiments, the RSR 110 may be configured to output a value of N stored therein. If the information sent by the DCE 108 to the selector 112 indicates that the intended physical address has been reordered (e.g., the information is a bit with value 1), the output N from the RSR 110 may be incremented (e.g., by incrementor 119) to provide the N+1, which may be output from the selector 112 to the mapping function 114. If the information sent by the DCE 108 to the selector 112 indicates that the intended physical address has not been reordered (e.g., information is a bit with value 0), the output N from the RSR 110 may not be incremented and N may be output from the selector 112 to the mapping function 114.

The mapping function 114 may be configured to perform N mapping or N+1 mapping based on the output from the selector 112. In either case (N mapping or N+1 mapping), each of the one or more intended physical addresses corresponding to the one or more access transactions 105 may be used to calculate a reordered physical address for the one or more access transactions 105 according to various embodiments. That is, a reordered physical address may be calculated for each of the one or more access transactions 105 in a case where the corresponding intended physical address has been reordered within a turnaround and also in a case where the corresponding intended physical address has not been reordered within the turnaround. N mapping provides a different input value (e.g., RSR.s and RSR.a) to the mapping function 114 than N+1 mapping. Thus, in some embodiments, a reordered physical address for an access transaction may have a first address if it is determined that the information stored at an intended physical address of the access transaction has been reordered within a turnaround and the reordered physical address may have a second address if it is determined that the information stored at the intended physical address of the access transaction has not been reordered within the turnaround, the first address being different than the second address, and the first and second address being different than the intended physical address.

The background reordering system 100 may provide dynamic pseudo-random address mapping (or "scrambling") in contrast to static address scrambling. For example, in static address mapping, a particular intended physical address may be mapped to a same reordered physical address each time the particular intended physical address is mapped. In dynamic address mapping, a particular intended physical address may be mapped to a different reordered physical address each time the particular intended physical address is mapped. In this regard, the mapping is dynamic because the mapping for a particular intended physical address may change over time.

In some embodiments, the DCE 108 may determine that an access transaction corresponds to "inflight" information stored in a temporary data register 111. When the access transaction has a corresponding intended physical address that is "inflight" (e.g., stored in the temporary data register 111), the access transaction is mapped to the temporary data register 111. The temporary data register 111 may be used to temporarily store information in the DCE 108 while, for example, the DCE 108 performs a circular reordering of a memory region controlled by the DCE 108. The DCE 108 may control the temporary data register 111 in some embodiments.

In some embodiments, a locking mechanism may be needed to protect copied lines "in process." For example, a subset of cells may be "locked" while a reordering takes place. According to various embodiments, the DCE 108 may track or provide a temporary attribute state that indicates whether one or more intended physical addresses are locked or in process.

In some embodiments, a port for additional write requests may be coupled to the DCE 108. The port may be coupled, for example, to a non-volatile memory controller to indicate to the controller to reserve bus cycles for the reordering transactions. In some embodiments, the access port 107 is configured to provide address, data and control signals for the one or more access transactions 105.

Figure 3:
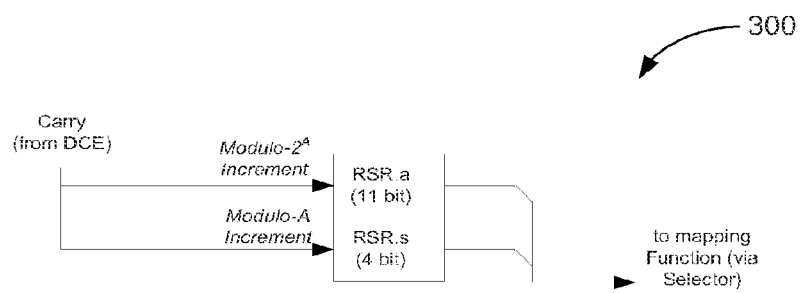
FIG. 3 illustrates a Reordering State Register (RSR) in accordance with some embodiments.

Referring to FIG. 3, which depicts a reordering state register (RSR) 300 in accordance with some embodiments, the instruction to increment may be received from a carry line from the DCE (e.g., DCE 108 of FIG. 1) and may increment the RSR.a component modulo-$2^A$ and increment the RSR.s component modulo-A, where A is a number of bits of the RSR.a. A period of the RSR 300 may be calculated by lcm(A, $2^A$), where lcm is a least common multiple. If A is an uneven number, then the period equals $A*2^A$. The period may repeat over a lifetime of the memory device. In some embodiments, A has a value of 11-bits.

In some embodiments, the RSR.s may include 4-bits representing a value between 0 and 10. When incremented at the end of a turnaround, the RSR.s may increment by one. For example, if the RSR.s holds a value of 1, then incrementing brings the value to 2 and so forth up to 9. If the RSR.s holds a value of 10, then incrementing brings the value to 0. In some embodiments, the RSR.a may include 11-bits representing a value between 0 and 2047. When incremented at the end of a turnaround, the RSR.a may increment by one. For example, if the RSR.a holds a value of 0, then incrementing brings the value to 1 and so forth up to 2047. If the RSR.a holds a value of 2047, then incrementing brings the value to 0. The values for RSR.s and the RSR.a may be output to the mapping function (e.g., mapping function 114 of FIG. 1) via selector (e.g., selector 112 of FIG. 1). The RSR 300 may include other values or increment in other ways in other embodiments. The RSR 110 of FIG. 1 may comport with embodiments described in connection with the RSR 300 in some embodiments.

Figure 4:
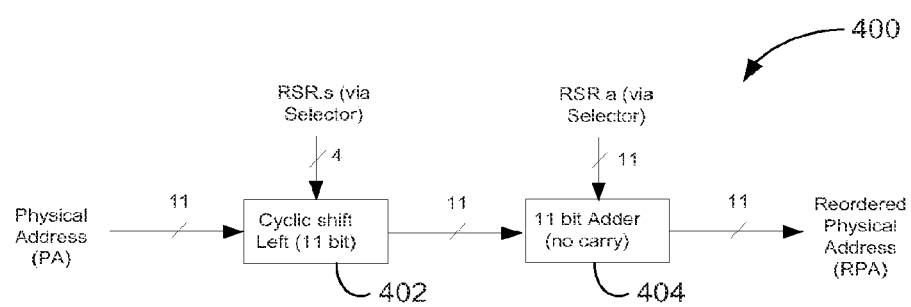
FIG. 4 illustrates a mapping function in accordance with some embodiments.

Referring to FIG. 4, which depicts a mapping function 400 in accordance with some embodiments, the RSR.s and the RSR.a (e.g., as described in connection with RSR 300 of FIG. 3) are used to map or calculate a reordered physical address based on a physical address in a pre-determined and pseudo-random order. The physical address may be an intended physical address for one of the one or more incoming access transactions (e.g., access transactions 105 of FIG. 1) and may be represented by an 11-bit value in some embodiments. According to various embodiments, the RSR.s may be used to cyclic shift left the physical address. For example, if the RSR.s has a value of 0, then an intermediate 11-bit address that is output from shifter function 402 may have a value equal to the PA[10:0]. If the RSR.s has a value of 1, then an intermediate 11-bit address that is output from shifter function 402 may have a value that is equal to 2*PA[9:0]+PA[10] where a lower ten bits are shifted one bit position to the left and a most significant bit is used as a least significant bit in the intermediate address. If the RSR.s has a value of 2, then an intermediate 11-bit address that is output from the shifter function 402 may have a value equal to 4*PA[8:0]+PA[10:9] where a lower nine bits are shifted two bit positions to the left and a most significant two bits are used as least significant two bits in the intermediate address. If RSR.s has a value of 3, then an intermediate 11-bit address that is output from shifter function 402 may have a value that is equal to 8*PA[7:0]+PA[10:8] where a lower eight bits are shifted three bit positions to the left and a most significant three bits are used as least significant three bits in the intermediate address, and so forth.

The intermediate address output from the shifter 402 may include unsigned 11-bit integers and may be input to adder 404. In some embodiments, a value of RSR.a is added to the intermediate address. In some embodiments, the value of RSR.a includes unsigned 11-bit integers. Carry may be ignored in the adder 404 to provide an output value between 0 and 2047. The output of the adder 404 is the reordered physical address.

Thus, the order in which the data is stored is pre-determined, which may allow for meta-data to be extremely small compared to solutions described in the background section. For example, information of only about 6 to 7 bytes may be needed for determining locations of all stored data in a 1 Terabyte class memory device.

The mapping function 400 may use alternative or more or less functions to provide a pre-determined pseudo-random mapping of the physical address to the reordered physical address in other embodiments. The mapping function 114 of FIG. 1 may comport with embodiments described in connection with the mapping function 400 in some embodiments.

Returning to FIG. 1, the mapping function 114 is configured to calculate or map the one or more reordered physical addresses based on the one or more intended physical addresses for the one or more access transactions 105 and values (e.g., N or N+1) of the RSR 110 (e.g., RSR.s and RSR.a). The one or more reordered physical addresses are sent to the memory device 116 for the memory device 116 to perform the one or more access transactions 105 at the one or more reordered physical addresses.

When the one or more incoming access transactions 105 trigger a wear-leveling operation, the RRC 106 may set a reorder request flag. The DCE 108 may send acknowledgement of the reorder request flag to the RRC 106, which may update the register 109 that tracks accumulated wear-leveling operations based on the acknowledgement. For example, the RRC 106 may decrement the register 109 by −25 based on the acknowledgement. In some embodiments, the DCE 108 may initiate address computation and data copying transactions for the wear-leveling operation in response to setting of the reorder request flag by the RRC 106.

In some embodiments, functionality of the background reordering system 100 that performs the wear-leveling operation and functionality that performs the normal write transactions operate in parallel, meaning, in at least one embodiment, that the functionality that performs the wear-leveling operation is configured to run concurrently with the functionality that performs the normal write transactions. For example, the RRC 106 may set a reorder request flag based on incoming access transactions 105 to the memory device 116 to trigger a wear-leveling operation. The background reordering system 100 may perform the wear-leveling operation concurrently with or subsequent to the one or more incoming access transactions 105.

Figure 5:
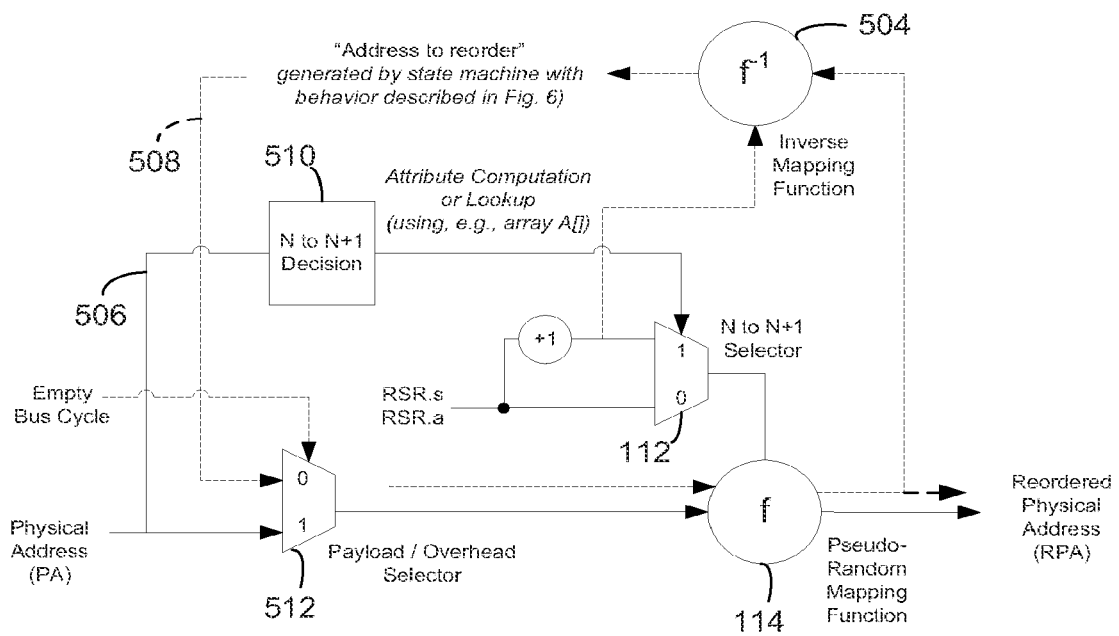
FIG. 5 schematically illustrates address computation in the Data Copying Engine (DCE) in accordance with some embodiments.

FIG. 5 schematically illustrates address computation in the Data Copying Engine (DCE) (e.g., DCE 108 of FIG. 1) in accordance with some embodiments. Solid lines represent an address computation path 506 for one or more incoming access transactions (e.g., access transactions 105 of FIG. 1) and dashed lines represent an address computation path 508 for wear-leveling reordering (e.g., a wear-leveling operation).

As previously described, the address computation path 506 for an incoming access transaction includes providing an intended physical address (e.g., PA) for an incoming access transaction to an N to N+1 decision block 510. At the N to N+1 decision block 510, it is determined whether to perform N or N+1 mapping for the intended physical address based on computation or look-up of a temporary attribute. For example, the DCE (e.g., DCE 108 of FIG. 1) may compute or look-up the temporary attribute corresponding to the intended physical address and send the temporary attribute to the N to N+1 Selector 112. Using a value of RSR.s and RSR.a that is selected based on the temporary attribute, the mapping function 114 calculates a reordered physical address using the physical address as a direct input to the mapping function 114.

The address computation path 508 for a wear-leveling operation includes generation of a physical address to reorder and address computation. In some embodiments, the DCE (e.g., DCE 108 of FIG. 1) may be configured to monitor activity of a bus to detect an empty bus cycle (e.g., 120 of FIG. 1). In some embodiments, the bus may correspond with access port 107 of FIG. 1 or any other bus that has activity corresponding to incoming access transactions to the memory device (e.g., bus that provides physical address for incoming access transactions). In some embodiments, a Payload/Overhead Selector (hereinafter "selector 512") may be configured to select a state (e.g., bit value of 0) corresponding to an empty bus cycle, which may allow the wear-leveling operation to proceed at a time when there are no incoming access transactions (e.g., access transactions 105 of FIG. 1) to the memory device (e.g., memory device 116 of FIG. 1). Accordingly, functionality for performing the wear-leveling operation may operate in the background and/or have a lower priority than normal access transactions such that the wear-leveling operation does not reduce available bandwidth or performance of the memory device. In such embodiments, the overhead for the wear-leveling operation may include mainly energy.

Detection of the empty bus cycle may, for example, trigger the DCE (e.g., DCE 108 of FIG. 1) to test or check the reorder request flag. If the reorder request flag is set, then the DCE may send an acknowledge indication to the RRC (e.g., RRC 106 of FIG. 1) and initiate address computation and data copying transactions of a wear-leveling operation. In some embodiments, the actions of flow 600 of FIG. 6 are performed by the DCE from 612 up to 626, back to 602 and up to 612 again upon detection of an empty bus cycle.

In some embodiments, the DCE 108 may generate a physical address for reordering (e.g., to receive a wear-leveling operation) and send the generated physical address to the mapping function 114 for calculation of a reordered physical address. The reordered physical address may be calculated based on the generated physical address and also based on a value of RSR.s and RSR.a that is input to the mapping function 114. Information may be copied from the generated physical address to the reordered physical address. In some cases, an Inverse Mapping Function $f^{-1}$ (hereinafter "inverse mapping function 504") as depicted in FIG. 5 may be used as part of the address computation path 608. An example using the inverse mapping function 504 is included with a description of FIG. 6.

Figure 6:
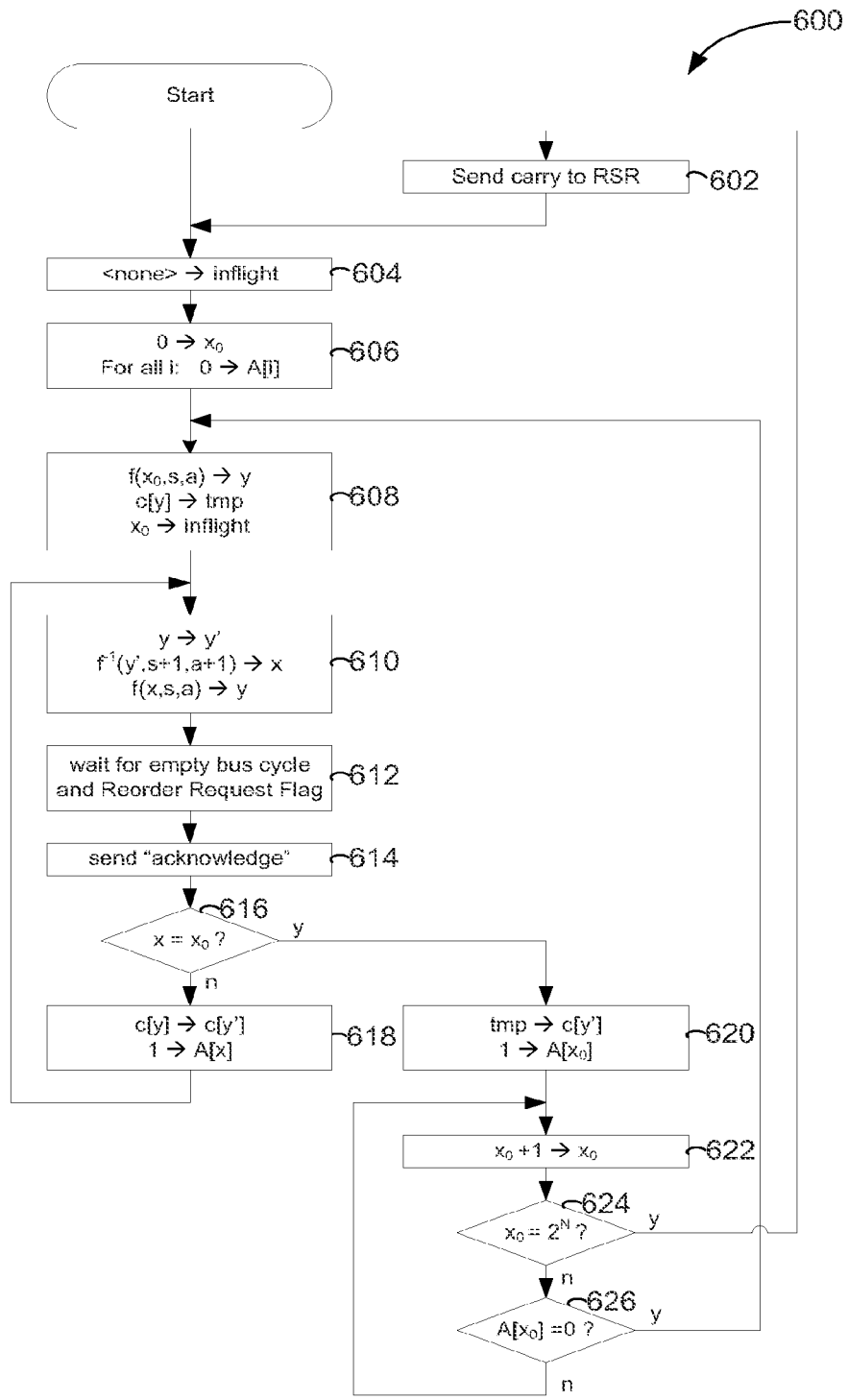
FIG. 6 illustrates an example flow of the DCE in accordance with some embodiments.

FIG. 6 illustrates an example flow 600 of the DCE (e.g., DCE 108 of FIG. 1) in accordance with some embodiments. Actions of the flow may be performed by a state machine or module of the DCE. The flow 600 is directed towards actions associated with the wear-leveling operation. For example, the flow 600 may describe actions performed by the DCE in connection with generating a physical address for a wear-leveling operation. Although the flow 600 does not expressly describe actions belonging to a normal access transaction, it is noted that by changing a value for A[ ] and sometimes also the RSR, the DCE may be changing mapping for normal access transactions that follow a wear-leveling operation.

The following terms are defined for the flow 600. The term f(x,s,a) represents the mapping function (e.g., mapping function 114 of FIG. 1), where x denotes a working register corresponding to the physical address input to the mapping function and s denotes the RSR.s and a denotes the RSR.a. The function result is a reordered physical address that is output from the mapping function. The term $f^{-1}(y,s,a)$ represents an inverse mapping function (e.g., inverse mapping function 504 of FIG. 5), which may be part of the DCE, where y denotes a working register corresponding to the reordered physical address output from the mapping function. The function result is a physical address that is output from the inverse mapping function. The terms x, $x_0$ represent working registers for the physical address and the terms y, y' represent working registers for the reordered physical address. The working registers x, $x_0$ may be used to generate the physical address for reordering (e.g., performing a wear-leveling operation). The working registers x, $x_0$ may be initialized at the beginning of each turnaround and may be modified with each wear-level transaction.

The term "inflight" in FIG. 6 represents an integer register telling to which address the data in a temporary register "tmp" (e.g., temporary data register 111 of FIG. 1) belongs. The term <none> can be coded as −1. The term A[ ] represents an array of 1-bit attributes for N to N+1 decision. A value of 0 may represent N and a value of 1 may represent N+1. The term $2^N$ may represent a total size of reordered memory region. The term c[ ] may represent memory cells of the memory device. For example, c[y]→c[y] may mean that memory content is copied from location y to y'.

Initializations for the flow 600 may take place at 604 and 606. At 604, the inflight address may be marked invalid to indicate that the temporary register does not contain any data.

At 606, a physical address stored in register $x_0$ may be set to zero to mark a leading address of a circular reordering scheme. Further, at 606, all temporary attributes i of array A[ ] may set to zero to indicate that all locations are not yet reordered.

At 608, a reordered physical address of register y of the leading address stored in $x_0$ may be determined. Such determination may be used to indicate where to read first data from the circular scheme. Data may, for example, be read from the memory device at the reordered physical address of register y and saved in the temporary register. The inflight address may be assigned the value of the physical address stored in $x_0$ to indicate that the temporary register holds data belonging to the physical address stored in $x_0$. Saving data in the temporary register may ensure that at least one location of the memory device is free for the reordering transaction.

At 610, the reordered physical address stored in y is copied to y' to allow y' to point to a free address where new data can be stored without overwriting existing data. Data stored at y' may be saved in the temporary register prior to the copying from y to y'. The result of the inverse mapping function with y' as an input and incremented s and a values may be stored in x to provide a physical address from which the data is taken to move to the free address. The mapping function is performed with an input of x, s, and a and the result is stored in y to facilitate data copying for the reordering transaction.

At 612 and 614, the flow 600 may be synchronized with the RRC (e.g., the RRC 106 of FIG. 1). At 612, the DCE may wait for an empty bus cycle and reorder request flag. The DCE may remain in this state most of the time. Testing for an empty bus cycle may avoid interference of the reordering transactions with normal data traffic and flag testing may facilitate achievement of a desired ratio of reordering transactions to normal access transactions. At 614, the DCE may send an acknowledge (e.g., to the RRC 106 of FIG. 1) in response to the reorder request flag being set.

At 616, the physical address stored at x is compared with the physical address stored at $x_0$ to test whether physical address stored at x (e.g., current address) has again reached the leading address stored at $x_0$ (e.g., if x=$x_0$, then yes, else no). At 618, in a case where it is determined that the physical address stored at x does not equal the physical address stored at $x_0$, data stored in y is moved to y' and the temporary attribute is updated to a value of 1 for the physical address stored in x. Data copying actions including actions at 610, 612 and 614 may be repeated. If it is determined that the physical address stored at x is equal to the physical address stored at $x_0$, then the end of a cycling reordering sequence (e.g., actions 610 through 618) has been reached and actions at 620 may be performed.

At 620, data from the temporary register may be written to y'. The temporary attribute for the physical address stored in x may be set to 1 indicating that the physical address has been reordered.

At 622, 624 and 626 the leading address stored at $x_0$ may be incremented until it reaches a physical address that has not been reordered (e.g., has temporary attribute of 0). When a physical address is reached that has not been reordered, such physical address may be stored as a new leading address of another cyclic scheme. At 622, the leading address stored at $x_0$ may be incremented. At 624, the DCE may test whether $x_0$ has reached a value that indicates that a turnaround is complete. If the turnaround is complete, then, at 602, the DCE may send a carry signal to the RSR to instruct the RSR to increment its values and the flow may continue at 604 and so forth. If the turnaround is not complete, then, at 626, the DCE may test whether the temporary attribute associated with $x_0$ is equal to 0, which if true, may indicate that a new leading address has been identified and the flow 600 may continue at

608 and so forth to begin a new cyclic copying sequence. If the test at 626 fails, then the actions at 622 through 626 may repeat until the test at 626 is true.

In some embodiments, an inverse mapping function (e.g., inverse mapping function 504 of FIG. 5) is used by the DCE to allow for a very small temporary data register, tmp, (e.g., temporary data register 111 of FIG. 1). For example, the temporary data register may be sized to store a single data set such as an amount of data that is associated with one single read or write operation. The inverse mapping function may be used in conjunction with a pseudo-random hole movement technique. For example, in some embodiments, the DCE may pick one physical address (e.g., stored in $x_0$) that has not yet been reordered for the turnaround. The DCE may, for example, select the physical address at $x_0$ based on temporary attributes of array A[ ]. The DCE may read the data from the reordered physical address at $y=f(x_0,s,a)$ and store it in the temporary data register, thus generating a "hole" in the memory device. The hole may now need to be filled with data that belongs to this location via N+1 mapping. Data belonging to a not-yet-determined physical address at x may be moved from a corresponding N mapped address to a corresponding N+1 mapped address (e.g., the "hole"). The reordered physical address of the hole may be stored at y'. A physical address stored at y (having N+1 mapping) may be obtained by performing the inverse mapping function to the reordered physical address at y' (e.g., $f^{-1}(y',s+1,a+1)$). The physical address at y obtained by the inverse mapping function may be stored at x. A reordered physical address (having N mapping) may be calculated for the physical address at x using the mapping function (e.g., mapping function 114 of FIG. 1). The data from the reordered physical address calculated using $y=f(x,a,s)$ may be written to the hole. The location where the data was taken from may become a new hole. In effect, the hole may be moving repeatedly and repetition of the described procedure may result in a pseudo random movement of the hole. The repetition may stop one operation before the hole reaches its original location, e.g., the location that once corresponded to $x_0$. The hole may be filled with the data from the temporary register. The DCE may repeat such procedure for another physical address that has not yet been reordered and assigns the other physical address to "$x_0$" so the entire procedure of hole movement is repeated. When all of the addresses have been reordered, the DCE turnaround is complete.

Returning again to FIG. 1, the background reordering system 100 may be organized in two or more dimensions where at least one of the dimensions uses pseudo-random ordering as described herein. The RRC 106, RSR 110, and mapping function 114 may be configured as previously described. The DCE 108 may be configured to track progress of reordering transactions in both dimensions. For example, the DCE 108 may start with a full turnaround in one page and proceed with a second page after the first page is completed. In such embodiment, a counter for the pages may be used to track turnaround progress of the reordering for the different pages. In some embodiments, the mapping function 114 may be only applied to a subset of the physical address such as, for example, the first dimension. The remaining portion of the physical address external to the subset may be unchanged in the mapping.

According to various embodiments, a wear-leveling operation is performed in a first dimension of at least two dimensions of the memory device 116. The first dimension may define a first level of memory organization such as, for example, an addressing scheme of memory storage (e.g., bit, line, page, row, column, etc.) and the second dimension may define a second level of memory organization such as, for example, another addressing scheme of memory storage. A physical address to be reordered (e.g., generated by the DCE) as part of the wear-leveling operation may include a first component that provides an index to the second dimension and a second component that may be dynamically mapped to an index in the first dimension. In some embodiments, the first dimension may include bit-level organization and the second dimension may include line-level organization. An index in the first dimension in such embodiments may indicate a bit within a line and an index in the second dimension may indicate the line. In other embodiments, the first dimension may include line-level organization and the second dimension may include page-level organization. In such embodiments, an index in the second dimension may indicate a line within a page and an index in the second dimension may indicate the page within the memory device. These embodiments are provided as examples and the first dimension and second dimension may represent other levels of memory organization in other embodiments (e.g., rows, columns, etc.).

In one embodiment, the first component which provides an index to the second dimension may be a counter which counts from zero to K−1, where K is the address space of the second dimension. The counter may be named RSR.c and may be used to point to the level of memory organization of the second dimension (e.g., page) that is currently in process of a reordering transaction. The counter may be incremented at the end of each turnaround performed within the memory organization of the second dimension (e.g., page). That is, in multiple dimension scenarios, the turnaround may be a time in which each cell/location of the second dimension has been reordered once. In some embodiments, the counter may be incremented modulo-K where the case of incrementing the value of K−1 results in 0. In some embodiments, the RSR.a and RSR.s values are only incremented in a case where incrementing the value of K−1 results in 0 or in a case where each cell/location of the second dimension has been reordered once.

The second component may provide or generate an index in the first dimension. The index may be generated, for example, using the flow 600 described in connection with FIG. 6 and may be dynamically mapped using a mapping function as described, for example, in connection with FIG. 4. For example, in embodiments where a full address has more than 11 bits, the second component may use 11 least significant bits in conjunction with the values of RSR.a and RSR.s for dynamically mapping within the first dimension.

Normal access transactions may be mapped by translating the least significant 11 bits via the mapping function and using the most significant bits directly and unchanged. A one-dimensional list of attributes (e.g. similar to previously described A[ ]) may be used to track a second dimension (e.g., page) of memory which is currently in a process of a reordering transaction.

In multiple dimension embodiments, the N to N+1 decision may include at least two actions. In a first action, the most significant address, represented by the most significant bits of an intended physical address may be compared with a value of the counter (e.g., RSR.c). If the most significant address is lower than the value of the counter, N+1 mapping may be used. If the most significant address is higher than the value of the counter, N mapping may be used. If the most significant address is equal to the value of the counter, the one dimensional list of attributes may be used to make the N or N+1 mapping decision as previously described in connection with the temporary attributes stored in A[ ] of FIG. 4.

In multiple dimension embodiments, the data reordering module 118 may not reorder across organizations of memory corresponding to the second dimension (e.g., page). That is, other techniques may be used to ensure equal wear out of all second dimension organizations of memory (e.g., pages) within the memory device.

In some embodiments, cache 104 of the processor 102 may be generating the one or more access transactions 105 and providing a physical address to the access port 107 for the one or more access transactions 105. The cache 104 may include a wear-out aware cache replacement policy. Such policy may be designed for the wear-out of main memory (e.g., the memory device in some embodiments) and may, for example, ignore the wear-out of the cache 104. The wear-out aware policy of the cache 104 may be aware of the wear-out on the memory device 116 (e.g., using write counters and/or ECC event counters). The background reordering system 100 may include an RRC 106, DCE 108, RSR 110, and mapping function 114 that are configured to support multiple dimensions as previously described. The background reordering system 100 may further include a wear-out tracking register in each line of the target device (e.g., the memory device 116) and a wear-out level register in each line of the cache 104.

In some embodiments, a wear-out aware cache replacement policy may be in place. For example, when choosing a cache line for eviction from the cache 104, the line holding the data for the least worn-out line in the target device may be selected. The level of wear out may be kept in the wear-out tracking register, which may exist in each line of the target device. The level of wear-out may, for example, be represented by an accumulated number writes to a line, which may equalize stress to lines in the target device. The level of wear-out may, for another example, be represented as a cost function modeling of the degree of wear-out (e.g., a combination of number of writes and accumulated ECC events), which may stress the most sensitive lines least. For example, the background reordering system 100 may reorder information of the target device in a first dimension resulting in an equal stress of all locations within a memory page. The wear-out ware cache replacement policy may be used to achieve an adapted stress level with respect to the pages, resulting in an adapted stress where some pages are stressed less and others more.

In some embodiments, the cache 104 of the processor 102 may be configured to choose between different cache entries for eviction when a replacement of a cache entry is necessary. The wear-out aware policy may influence this decision (e.g., using the cost function). The resulting eviction may generate an access transaction (e.g., 105) to the memory device 116 targeting, for example, the memory page with based on wear-out. Furthermore, the background reordering system 100 may reorder the data within the memory page according to multiple dimension scenarios described herein. In some embodiments, a RRC 106 may be provided for each individual memory page of the memory device 116.

In some embodiments, the one or more incoming access transactions 105 to the memory device 116 include one or more evicted cachelines that are received from the cache 104 of the processor 102. The wear-out aware policy of the cache may select, in a first dimension, a physical address of the memory device 116 for storing the one or more evicted cachelines. The background reordering system 100 may reorder the one or more evicted cachelines in a second dimension. The wear-out aware policy of the cache may be aware of the wear-out on another device (e.g., the memory device 116) in some embodiments. For example, the wear-out of the memory device may be estimated by keeping statistics of potential bit-error events, such as "maximum observed number of bit-errors per block" and/or "accumulated number of bit errors per block". In an environment where the functionality of "wear-out" awareness is used, such statistics or pointers to most sensitive cells or blocks may be stored in the main memory or in a dedicated memory of the background reordering system 100. The statistics could, for example, be kept for all memory cells or blocks, or only for the memory cells or blocks that are most sensitive to wear out. In some embodiments, a wear-out aware policy of the cache is configured to primarily evict the cachelines which are mapped to the least worn-out memory regions and to prioritize the eviction based on statistics (e.g., bit-error events).

The RRC 106, the DCE 108, the RSR 110, the mapping function 114, and other components of the background reordering system 100 described herein may each be a module or combined in various modules. As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. Embodiments described in connection with FIGS. 1-6 may be combined in some embodiments.

Figure 7:
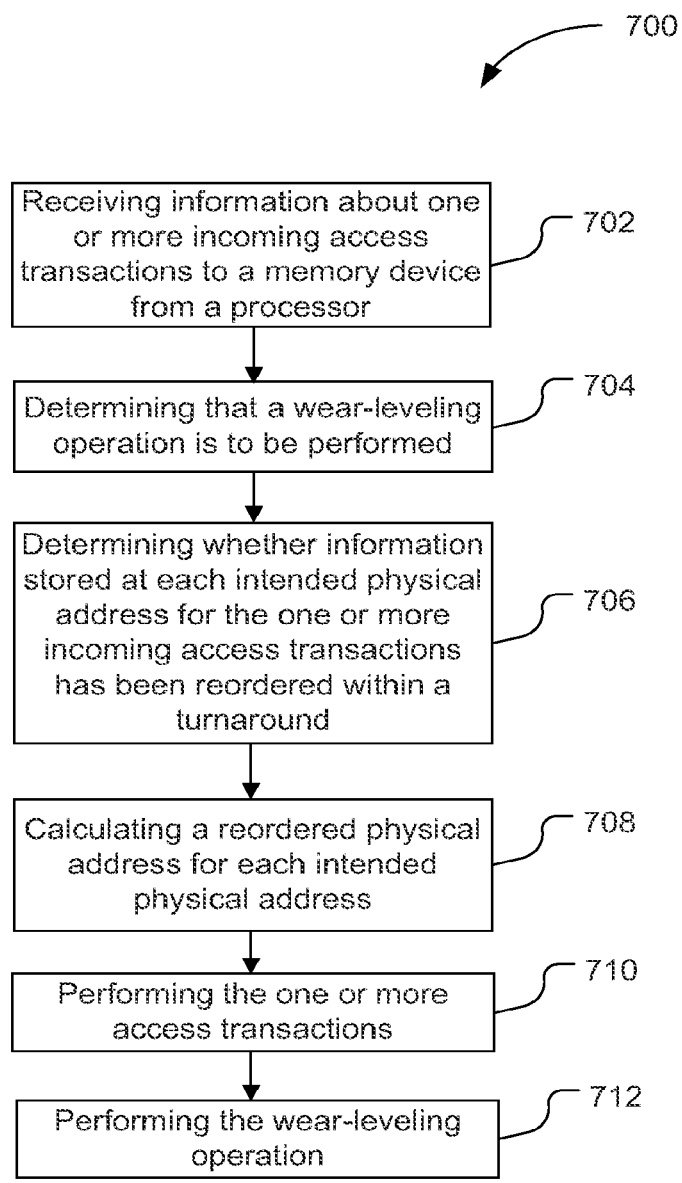
FIG. 7 is a flow diagram for a method of background reordering in accordance with some embodiments.

FIG. 7 is a flow diagram for a method 700 of background reordering in accordance with some embodiments. At 702, the method includes receiving information about one or more incoming access transactions (e.g., access transactions 105 of FIG. 1) from a processor (e.g., processor 102 of FIG. 1). The information may include one or more intended physical addresses that correspond with the one or more incoming access transactions.

At 704, the method 700 includes determining that a wear-leveling operation is to be performed. The determining may be performed, for example, by RRC (e.g., RRC 106 of FIG. 1) based on a cumulative number of access transactions to the memory device (e.g., memory device 116 of FIG. 1). The cumulative number of access transactions may include the one or more incoming access transactions according to various embodiments. The cumulative number of access transactions may be temporally cumulative in some embodiments. The determining may include, for example, comparing a ratio to a pre-determined value, the ratio including a cumulative number of wear-leveling operations performed for the memory device relative to a cumulative number of write transactions received for the memory device. A wear-leveling operation may be performed if the ratio deviates from the pre-determined value. Other techniques described herein may be used.

At 706, the method 700 includes determining whether information stored at each intended physical address for the one or more incoming access transactions has been reordered within a turnaround. The DCE (e.g., DCE 108 of FIG. 1) may compute or access a temporary attribute for each physical address that indicates whether the information stored at each physical address has been reordered or not for the turnaround.

At 708, the method 700 includes calculating a reordered physical address for each intended physical address. A register value (e.g., RSR.s or RSR.a of FIG. 1) of RSR (e.g., RSR 110 of FIG. 1) may be based on the temporary attribute computed or accessed by the DCE. The mapping function (e.g., mapping function 114 of FIG. 1) may use the register value as an input to calculate a reordered physical address for an incoming access transaction based on the intended physical address for the incoming access transaction.

At 710, the method 700 includes performing the one or more access transactions. The mapping function may output the reordered physical address to the memory device for performance of the one or more access transactions at the reordered physical address.

At 712, the method 700 includes performing the wear-leveling operation. The DCE may be configured to monitor activity of a bus (e.g., access port 107 of FIG. 1) of the memory device. Upon detection of an empty bus cycle, the DCE may check to see whether a wear-leveling operation is to be performed (e.g., at 704). If it is determined that the wear-leveling operation is to be performed, the DCE may generate a physical address to be reordered, map the generated physical address to a reordered physical address using the mapping function, and copy information from the generated physical address to the reordered physical address. The wear-leveling operation may be performed according to techniques described, e.g., in connection with FIGS. 5-6.

Figure 8:
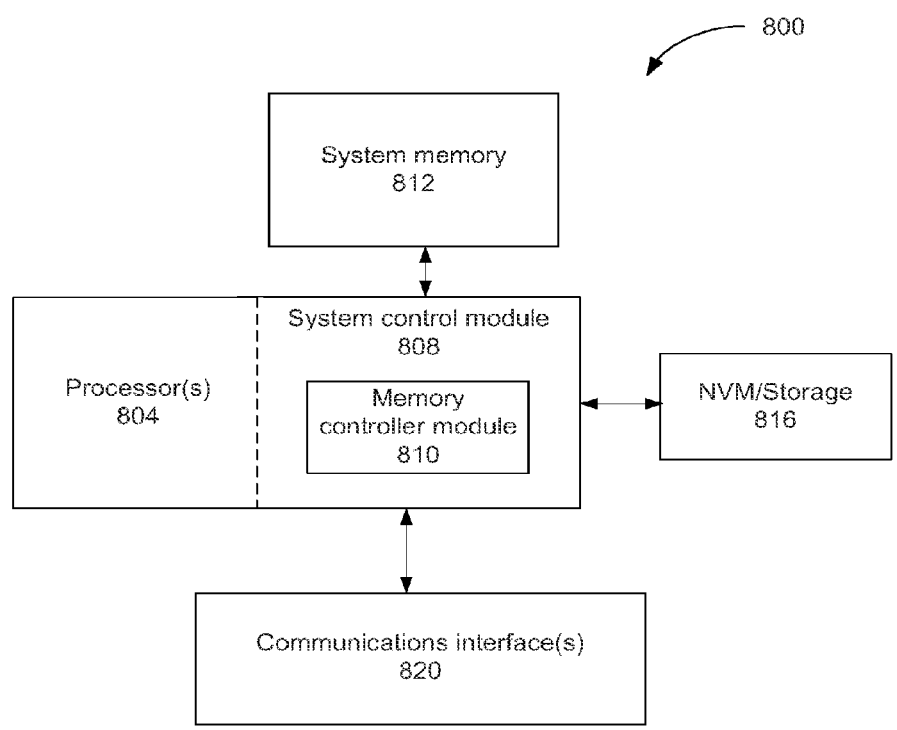
FIG. 8 schematically illustrates an example processor-based system that may be used to practice various embodiments described herein.

Embodiments of the present disclosure may be implemented into a system using any suitable hardware and/or software to configure as desired. FIG. 8 schematically illustrates an example processor-based system 800 that may be used to practice various embodiments described herein. For example, the background reordering system 100 of FIG. 1 may be part of the processor-based system 800. In one embodiment, the system 800 includes one or more processor(s) 804. One of the one or more processor(s) 804 may correspond with the processor 102 of FIG. 1.

The system 800 may further include system control module 808 coupled to at least one of the processor(s) 804, system memory 812 coupled to system control module 808, non-volatile memory (NVM)/storage 816 coupled to system control module 808, and one or more communications interface(s) 820 coupled to system control module 808. In some embodiments, the memory device 116 of FIG. 1 may be part of the system memory 812 and/or the NVM/Storage 816.

System control module 808 for one embodiment may include any suitable interface controllers to provide for any suitable interface to at least one of the processor(s) 804 and/or to any suitable device or component in communication with system control module 808.

System control module 808 may include a memory controller module 810 to provide an interface to system memory 812. The memory controller module 810 may be a hardware module, a software module, and/or a firmware module.

System memory 812 may be used to load and store data and/or instructions, for example, for system 800. System memory 812 for one embodiment may include any suitable volatile memory, such as suitable DRAM, for example.

System control module 808 for one embodiment may include one or more input/output (I/O) controller(s) to provide an interface to NVM/storage 816 and communications interface(s) 820.

The NVM/storage 816 may be used to store data and/or instructions, for example. NVM/storage 816 may include any suitable non-volatile memory, such as PCM or flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 816 may include a storage resource physically part of a device on which the system 800 is installed or it may be accessible by, but not necessarily a part of, the device. For example, the NVM/storage 816 may be accessed over a network via the communications interface(s) 820.

Communications interface(s) 820 may provide an interface for system 800 to communicate over one or more wired or wireless network(s) and/or with any other suitable device.

For one embodiment, at least one of the processor(s) 804 may be packaged together with logic for one or more controller(s) of system control module 808, e.g., memory controller module 810. For one embodiment, at least one of the processor(s) 804 may be packaged together with logic for one or more controllers of system control module 808 to form a System in Package (SiP). For one embodiment, at least one of the processor(s) 804 may be integrated on the same die with logic for one or more controller(s) of system control module 808. For one embodiment, at least one of the processor(s) 804 may be integrated on the same die with logic for one or more controller(s) of system control module 808 to form a System on Chip (SoC).

In various embodiments, the system 800 may be, but is not limited to, a server, a workstation, a desktop computing device, or a mobile computing device (e.g., a laptop computing device, a handheld computing device, a handset, a tablet, a smartphone, a netbook, etc.). In various embodiments, the system 800 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method comprising:
   receiving information about one or more incoming access transactions to a memory device from a processor;
   determining that a wear-leveling operation is to be performed based on a cumulative number of access transactions to the memory device, the cumulative number of access transactions including the one or more incoming access transactions; and
   performing the wear-leveling operation by
      mapping a first physical address of the memory device to a second physical address of the memory device based on a pseudo-random mapping function; and
      copying information from the first physical address to the second physical address;
   wherein the wear-leveling operation is performed in a first dimension of at least two dimensions of the memory device, the first dimension defining a first level of memory organization and a second dimension defining a second level of memory organization;
   wherein a first component of the first physical address provides an index to the second dimension; and
   wherein a second component of the first physical address is dynamically mapped to an index in the first dimension.

2. The method of claim 1, wherein determining that a wear-leveling operation is to be performed comprises:
   comparing a ratio to a pre-determined value, the ratio including a cumulative number of wear-leveling operations performed for the memory device relative to a cumulative number of write transactions received for the memory device.

3. The method of claim 2, wherein the wear-leveling operation is performed if the ratio deviates from the pre-determined value.

4. The method of claim 1, wherein the information received about the one or more incoming access transactions includes one or more third physical addresses from the processor that correspond with the one or more incoming access transactions, the method further comprising:
mapping the one or more third physical addresses to one or more fourth physical addresses.

5. The method of claim 4, further comprising:
determining whether information stored at the one or more third physical addresses has been reordered within a turnaround, the turnaround being a cyclical period defined by a time in which information stored at each physical address of the memory device has been reordered once, wherein each physical address has a corresponding temporary attribute that indicates whether the information stored at each physical address has been reordered or not for the turnaround.

6. The method of claim 5, further comprising:
performing the one or more access transactions at the one or more fourth physical addresses, wherein ones of the one or more fourth physical addresses have a first value if it is determined that the information stored at corresponding ones of the one or more third physical addresses has been reordered within a turnaround, wherein ones of the one or more fourth physical addresses have a second value if it is determined that the information stored at corresponding ones of the one or more third physical addresses has not been reordered within a turnaround, the first value representing a different physical address than the second value, the one or more fourth physical addresses being different than the one or more third physical addresses.

7. The method of claim 1, further comprising:
monitoring activity of a bus, wherein performing the wear-leveling operation is triggered by detection of an empty bus cycle.

8. The method of claim 1, wherein:
the index to the first dimension indicates a bit within a line;
the index to the second dimension indicates the line; and
wherein the one or more incoming access transactions to the memory device include one or more evicted cachelines that are received from a cache of the processor, wherein a wear-out aware policy of the cache selects, in the second dimension, a third physical address of the memory device for storing the one or more evicted cachelines, the wear-out aware policy being aware of the wear-out of the memory device.

9. An apparatus, comprising:
an access port to receive information about one or more incoming access transactions to a memory device from a processor;
a reorder rate control module to determine that a wear-leveling operation is to be performed based on a cumulative number of access transactions received for the memory device, the cumulative number of access transactions including the one or more incoming access transactions; and
a data reordering module to perform the wear-leveling operation by copying information from a current physical address of the memory device to a reordered physical address of the memory device based on said determination that the wear-leveling is to be performed and on a pseudo-random function;
wherein the data reordering module is configured to perform the wear-leveling operation in a first dimension of at least two dimensions of the memory device, the first dimension defining a first level of memory organization and a second dimension defining a second level of memory organization, the second dimension being different than the first dimension;
wherein a component of the current physical address provides an index to the second dimension; and
wherein another component of the current physical address is dynamically mapped to an index in the first dimension.

10. The apparatus of claim 9, wherein the reorder rate control module is to determine that a wear-leveling operation is to be performed by comparing a ratio to a pre-determined value, the ratio including a cumulative number of wear-leveling operations performed for the memory device relative to a cumulative number of write transactions received for the memory device, wherein the wear-leveling operation is performed if the ratio deviates from the pre-determined value.

11. The apparatus of claim 9, wherein the information received by the access port includes one or more intended physical addresses that correspond with the one or more incoming access transactions; and
wherein the data reordering module includes a mapping function that is configured to calculate a reordered physical address for each of the one or more intended physical addresses.

12. The apparatus of claim 11, wherein the reorder rate control module is configured to set a request flag based on a determination that the wear-leveling operation is to be performed;
wherein the data reordering module includes a data copying engine is configured to initiate copying of information from the current physical address of the memory device to the reordered physical address of the memory device based on the request flag; and
wherein the mapping function that is configured to calculate the reordered physical address of the wear-leveling operation using the current physical address.

13. The apparatus of claim 12, wherein the data copying engine is configured to determine whether information stored at the one or more intended physical addresses has been reordered within a turnaround, the turnaround being a cyclical period defined by a time in which information stored at each physical address of the memory device has been reordered once, wherein a temporary attribute corresponds to each physical address of the memory device having information stored therein, the temporary attribute indicating whether the information stored at each physical address has been reordered or not for the turnaround.

14. The apparatus of claim 13, wherein the data reordering module further includes:
a reorder state register that includes at least one value that is incremented for each turnaround, wherein the mapping function is configured to calculate the reordered physical address of the wear-leveling operation and the reordered physical address for each of the one or more intended physical addresses based on the at least one value.

15. The apparatus of claim 9, wherein the data reordering module is configured to monitor activity of the access port and is triggered to perform the wear-leveling operation when an empty bus cycle of the access port is detected.

16. The apparatus of claim 11, wherein the memory device is configured to perform the one or more access transactions at the reordered physical addresses for each of the one or more intended physical addresses, wherein the one or more access transactions are performed in parallel with the data reordering module performing the wear-leveling operation.

17. The apparatus of claim 9, wherein:
the index to the first dimension indicates a bit within a line;
the index to the second dimension indicates the line; and
wherein the one or more incoming access transactions to the memory device include one or more evicted cachelines that are received from a cache of the processor, wherein a wear-out aware policy of the cache is configured to select, in the second dimension, a physical address of the memory device for storing the one or more evicted cachelines, the wear-out aware policy being aware of the wear-out of the memory device.

18. A system, comprising:
a processor having a cache;
an access port to receive information about one or more incoming access transactions to a memory device from the processor;
a reorder rate control module to determine that a wear-leveling operation is to be performed based on a cumulative number of access transactions received for the memory device, the cumulative number of access transactions including the received one or more incoming access transactions; and
a data reordering module to perform the wear-leveling operation by copying information from a first physical address of the memory device to a second physical address of the memory device based on said determination that the wear-leveling is to be performed, wherein the wear-leveling operation follows a pre-determined and pseudo-random order;
wherein the data reordering module is configured to perform the wear-leveling operation in a first dimension of at least two dimensions of the memory device, the first dimension defining a first level of memory organization and a second dimension defining a second level of memory organization, the first dimension including bit-level access and the second dimension including line-level access;
wherein a first component of the first physical address provides an index to the second dimension;
wherein a second component of the first physical address is dynamically mapped to an index in the first dimension; and
wherein the one or more incoming access transactions to the memory device include one or more evicted cachelines that are received from the cache, wherein a wear-out aware policy of the cache is configured to evict cachelines that are mapped to least worn out physical addresses of the memory device based on statistics of potential bit-error events, the statistics including maximum observed number of bit-errors per block and/or accumulated number of bit errors per block.

19. The system of claim 18, wherein the reorder rate control module is configured to determine that a wear-leveling operation is to be performed by comparing a ratio to a pre-determined value, the ratio including a cumulative number of wear-leveling operations performed for the memory device relative to a cumulative number of write transactions received for the memory device, wherein the wear-leveling operation is performed if the ratio deviates from the pre-determined value.

20. The system of claim 18, wherein the information about the one or more incoming access transactions received by the access port includes one or more intended physical addresses that correspond with the one or more incoming access transactions; and
wherein the data reordering module is configured to calculate a reordered physical address for each of the one or more intended physical addresses.

21. The system of claim 20, wherein the data reordering module is configured to determine whether information stored at the one or more intended physical addresses has been reordered within a turnaround, the turnaround being a cyclical period defined by a time in which information stored at each physical address of the memory device has been reordered once, wherein each physical address has a corresponding temporary attribute that indicates whether the information stored at each physical address has been reordered or not for the turnaround.

22. The system of claim 20, wherein the memory device is configured to perform the one or more access transactions at the reordered physical address corresponding to the one or more access transactions, wherein the one or more access transactions are performed in parallel with the data reordering module performing the wear-leveling operation.

23. The system of claim 20, wherein the data reordering module is configured to perform the wear-leveling operation by calculating the second physical address of the wear-leveling operation using the first physical address.

24. The system of claim 18, wherein the data reordering module is configured to monitor activity of the access port and is triggered to perform the wear-leveling operation when an empty bus cycle of the access port is detected.

* * * * *

UNITED STATES PATENT AND TRADEMARK OFFICE
CERTIFICATE OF CORRECTION

PATENT NO.         : 9,268,686 B2                                       Page 1 of 1
APPLICATION NO.    : 13/991338
DATED              : February 23, 2016
INVENTOR(S)        : Niklas Linkewitsch It is certified that error appears in the above-identified patent and that said Letters Patent is hereby corrected as shown below:

Claims

Claim 12, column 22
Line 31 reads "engine is" and should read --engine--.

Claim 12, column 22
Line 35 reads "function that is" and should read --function is--.

Signed and Sealed this
Twenty-sixth Day of July, 2016

Michelle K. Lee
*Director of the United States Patent and Trademark Office*